US011020747B2

(12) United States Patent
Bynélius

(10) Patent No.: US 11,020,747 B2
(45) Date of Patent: Jun. 1, 2021

(54) DEVICE FOR DISSOLVING COMPRESSED BLOCKS OF INSULATION, A LOOSE FILL INSULATION APPARATUS AND A METHOD FOR DISSOLVING COMPRESSED BLOCKS OF INSULATION

(71) Applicant: Cellulose Insulation Production Scandinavia CPS AB, Djursholm (SE)

(72) Inventor: Jan-Olof Bynélius, Djursholm (SE)

(73) Assignee: CELLULOSE INSULATION PRODUCTION SCANDINAVIA CPS AB, Djursholm (SE)

( * ) Notice: Subject to any disclaimer, the term of this patent is extended or adjusted under 35 U.S.C. 154(b) by 1105 days.

(21) Appl. No.: 14/578,563

(22) Filed: Dec. 22, 2014

(65) Prior Publication Data

US 2015/0102143 A1 Apr. 16, 2015

Related U.S. Application Data

(63) Continuation of application No. PCT/SE2013/050716, filed on Jun. 18, 2013.

(30) Foreign Application Priority Data

Jun. 28, 2012 (SE) .................................... 1250722-4
Mar. 25, 2013 (SE) .................................... 1350378-4

(51) Int. Cl.
*B02C 4/30* (2006.01)
*B02C 4/12* (2006.01)
(Continued)

(52) U.S. Cl.
CPC .................. *B02C 4/30* (2013.01); *B02C 4/12* (2013.01); *B02C 4/286* (2013.01); *B02C 23/20* (2013.01)

(58) Field of Classification Search
CPC .. B02C 4/12; B02C 4/30; B02C 4/286; B02C 23/20
(Continued)

(56) References Cited

U.S. PATENT DOCUMENTS 173,620 A * 2/1876 Gillett ........................ B02C 4/12 241/239
926,241 A * 6/1909 Chesebro ................. A23G 9/12 366/183.1
(Continued)

FOREIGN PATENT DOCUMENTS

CN 2099614 U 3/1992
CN 2709001 Y 7/2005
(Continued)

*Primary Examiner* — Faye Francis
(74) *Attorney, Agent, or Firm* — Gabriela B. Tomescu, Esq.; Bergenstråhle & Partners AB

(57) ABSTRACT

The invention relates to a device for dissolving compressed blocks of loose-fill cellulose thermal insulation material. The device includes a support surface for the compressed blocks of insulation and a cylinder with protruding members arranged on the cylinder mantel surface. Said cylinder is rotatable around a substantially horizontal axis to process and dissolve the compressed blocks of insulation between the protruding members and a processing zone arranged by an edge of said support surface. The invention discloses that said protruding members arranged on the cylinder mantel surface are elongated protrusions extending substantially parallel to the horizontal axis. The invention further discloses that the cylinder is arranged to rotate inside of an arc-shaped surface partly covering the cylinder mantel surface and prolonging the milling zone in a peripheral direction of the cylinder. Further, the invention relates to a loose fill insulation apparatus.

5 Claims, 3 Drawing Sheets

(51) Int. Cl.
*B02C 23/20* (2006.01)
*B02C 4/28* (2006.01)

(58) Field of Classification Search
USPC ........................................ 241/28, 242, 243, 605
See application file for complete search history.

(56) References Cited

U.S. PATENT DOCUMENTS

| | | | | | |
|---|---|---|---|---|---|
| 1,339,932 | A | | 5/1920 | Liggett | |
| 1,717,126 | A | * | 6/1929 | State | B02C 4/12 241/222 |
| 2,911,981 | A | * | 11/1959 | Bauer | A24B 3/06 131/327 |
| 2,919,863 | A | * | 1/1960 | Lejeune | D21D 1/22 241/186.3 |
| 3,040,794 | A | * | 6/1962 | Jacobsen | A01F 29/00 241/73 |
| 4,077,450 | A | * | 3/1978 | Ackerman | B27L 11/02 144/162.1 |
| 4,082,198 | A | * | 4/1978 | Anderson | A01F 29/005 239/651 |
| 4,183,472 | A | * | 1/1980 | Packard | A01F 29/005 198/533 |
| 4,815,667 | A | | 3/1989 | Keller | |
| 5,413,286 | A | * | 5/1995 | Bateman | B02C 13/04 241/190 |
| 5,419,498 | A | * | 5/1995 | Rasmussen | D21B 1/08 241/280 |
| 5,590,839 | A | * | 1/1997 | Condrey | A01F 29/005 241/186.35 |
| 5,713,525 | A | * | 2/1998 | Morey | B02C 18/144 241/222 |
| 5,881,959 | A | * | 3/1999 | Hadjinian | B02C 18/145 241/186.35 |
| 5,975,443 | A | | 11/1999 | Hundt et al. | |
| 6,227,469 | B1 | * | 5/2001 | Daniels, Jr. | B02C 13/06 241/186.3 |
| 7,036,757 | B2 | * | 5/2006 | Kisenwether | A01K 5/005 241/101.76 |
| 7,070,132 | B1 | | 7/2006 | Gassman | |
| 7,832,670 | B2 | * | 11/2010 | Peterson | B02C 13/286 241/186.35 |
| 9,272,287 | B2 | * | 3/2016 | O'Leary | B02C 18/2216 |
| 10,099,224 | B2 | * | 10/2018 | Peterson | B02C 18/145 |
| 2006/0024456 | A1 | * | 2/2006 | O'Leary | B02C 18/146 428/34.1 |
| 2013/0020422 | A1 | * | 1/2013 | Bynelius | B02C 18/28 241/28 |
| 2013/0341449 | A1 | * | 12/2013 | Dux | B02C 18/18 241/222 |
| 2014/0319250 | A1 | * | 10/2014 | Roozeboom | B02C 18/22 241/27 |

FOREIGN PATENT DOCUMENTS

| | | | |
|---|---|---|---|
| CN | 202087342 | U | 12/2011 |
| WO | 2011090422 | | 7/2011 |

* cited by examiner

DEVICE FOR DISSOLVING COMPRESSED BLOCKS OF INSULATION, A LOOSE FILL INSULATION APPARATUS AND A METHOD FOR DISSOLVING COMPRESSED BLOCKS OF INSULATION

This application is a continuation of PCT/SE2013/050716, filed Jun. 18, 2013, which claims priority to SE 1250722-4, filed on Jun. 28, 2012 and SE 1350378-4, filed on Mar. 25, 2013.

BACKGROUND

The present invention relates to a device for dissolving compressed blocks of insulation, preferably loose-fill cellulose thermal insulation, a loose fill insulation apparatus and a method for dissolving a block made by loose-fill cellulose thermal insulation material.

Loose-fill insulation is used to insulate structures and buildings and is a quick and convenient alternative to insulation with mineral fiber isolation sheets. The loose-fill insulation is with the assistance of compressed air blown by an insulation apparatus into cavities in the building structure, such as for example into walls and on attics, forming a heat and cold insulation layer. The insulation used is mainly made of mineral fiber or cellulosic fiber such as pulp or pieces of paper. In order for the cellulosic fibers to be able to withstand the various conditions in building structures it is treated with various additives having fire retardant and other properties. Cellulosic fibers are organic and are therefore an environmental friendly and renewable insulation material. Loose-fill cellulose thermal insulation can be made out of recycled or newly produced paper cut into smaller pieces. These cut pieces of paper are easy and economic to produce and have a good insulation capacity at a relatively low density.

A known method of insulating building structures with loose-fill cellulose thermal insulation material can be described as follows. The loose-fill cellulose thermal insulation material is compressed into a density of 90-140 kg/m3 and put into bags to be transported to the building site. At the building site the bag is opened and the material is put into a hopper arranged in the insulation apparatus. In the hopper there is a device for picking apart and fluff up the compressed cellulose thermal insulation material into a density and form possible to blow into the building elements by using a compressed air source. The device for fluffing up the compressed cellulose thermal insulation material has in most insulation apparatuses been one or several rotating arms making a horizontal vortex in the material. Due to the power needed to break apart pieces from the compressed material, the engine driving the rotating arms has been forced to be very powerful. With relatively long arms it is also difficult to receive an even density of the fluffed insulation material. A material with an uneven density containing lumps of material is difficult to distribute into the structure.

Normally the transportation to the building site is made by a truck and semitrailer. A material with a density of 90-140 $kg/m^3$ contains a large amount of air and only fills 30-50% of the trailer volume. It is therefore desirable used loose-fill insulation material compressed to a greater extent. However, due to the great amount of energy needed to break apart a compressed material it is difficult to use an even more compressed loose-fill material in an insulation apparatus according to the above description.

The above mentioned difficulty is addressed by a shredding device designed by the applicant and a method using such a device, see WO2011/090422A1. The shredding device comprises a rotatable shredder cylinder with protruding pins which is adapted to grate, pick apart and fluff the insulation from a compressed block format into a fluff material with an even density.

This shredding device and the method using the device is now further developed by the applicant and its new and inventive features increases the efficiency of the processing process.

SUMMARY OF INVENTION

An object of the present invention is to create a device for dissolving a highly compressed block of loose-fill cellulose thermal insulation material that addresses some or all of the above mentioned disadvantages. The device may be a part of a specially designed loose fill apparatus or may be attached as an add-on part to an existing apparatus for insulation with loose-fill insulation. A further object of the invention is to develop a loose fill apparatus comprising such a device and a method for dissolving compressed blocks of loose-fill insulation.

These objects are achieved by a device, a loose fill apparatus and method according to the present claims.

The device according to claim 1 is a device for dissolving compressed blocks of loose-fill cellulose thermal insulation material. The device comprises a support surface for the compressed blocks of insulation and a cylinder with a cylinder mantel surface and a first and a second cylinder edge. Protruding members are arranged on the cylinder mantel surface. Said cylinder is rotatable around a substantially horizontal axis in order to process and dissolve the compressed blocks of insulation between the protruding members and a processing zone arranged by an end of said support surface. The invention is characterized in that the said protruding members arranged on the cylinder mantel surface are elongated protrusions extending substantially parallel to the horizontal axis.

The elongated protruding members extend substantially along the entire length of the cylinder, i.e. essentially from the first to the second cylinder edge. It is also possible that the elongated protruding members cover only parts of the cylinder mantel surface, however still extending essentially along the length direction of the cylinder. When the cylinder rotates the protruding members tears the blocks of insulation apart into smaller lumps or directly into the fluffed material with its desired density. Some lumps of the material stay on the protruding members and follow the rotation of the cylinder and are once again processed between the protruding members and the processing zone. Thus, the insulation is further divided into even smaller parts which form the end material with the desired density. Thus, the compressed insulation material dissolved by the device receives an even lower density containing fewer lumps than the previously known shredding device. A material with a low and even density containing no lump can easily be injected into the structure to be insulated by using an insulation apparatus, without the risk of jamming the apparatus or its external pipes.

In another embodiment said protruding members are elongated ridges with at least one sharp cutting edge.

Preferably the sharp cutting edge is arranged on the side of the protruding member facing the support surface and the processing zone when the cylinder rotates. A protruding member having the shape of an elongated ridge with at least one sharp cutting edge effectively cuts into the material.

In another embodiment the protruding members are divided in at least two parts arranged at an angle in relation to each other creating a v-shape. Preferably, said angle is between 20° and 50°, preferably 30°.

Using protruding members shaped as ridges having a v-shape make the dissolving process even more effective and forces the insulation material to move in the rotating direction of the cylinder, thus, minimizing the risk of jamming.

In another embodiment the cylinder is arranged to rotate inside of an arc-shaped surface partly covering the cylinder mantel surface, thus prolonging the processing zone in a peripheral direction of the cylinder. Preferably, the arc-shaped surface is covering between 10% and 30%, preferably between 15% and 25% of the cylinder mantel surface.

The invention also relates to a device for dissolving compressed blocks of loose-fill cellulose thermal insulation material comprising a support surface for the compressed blocks of insulation and a cylinder with protruding members arranged on the cylinder mantel surface. Said cylinder is rotatable around a substantially horizontal axis in order to mill and dissolve the compressed blocks of insulation between the protruding members and a milling zone arranged by an end of said support surface. The invention is characterized in that the cylinder is arranged to rotate inside of an arc-shaped surface partly covering the cylinder mantel surface and prolonging the milling zone in a peripheral direction of the cylinder.

By using an arc-shaped surface to cover a part of the cylinder mantel surface and prolonging the processing zone, the material to be dissolved have to travel a further distance in the processing zone between the arc-shaped surface and the cylinder with its protrusions. Thus, the compressed insulation material dissolved by the device may receive an even lower density containing even fewer lumps.

In one embodiment the arc-shaped surface comprises a friction creating arrangement arranged facing the cylinder.

By increasing the friction in the processing zone, the time the insulation material spends in the processing zone is increased. Thus, the material is processed during a longer time and fewer lump remains.

In another embodiment the friction creating arrangement comprises at least one protrusion protruding in a substantially radial direction inwards from the arc-shaped surface.

Using inwardly extending protrusions is a simple yet effective way to create the friction needed to detain the material in the processing zone the required time. However, it is also possible to use other types of friction creating arrangements such as for example adding a high friction material to the arc-shaped surface.

In one embodiment, the at least one protrusion is at least one elongated ridge with at least one sharp cutting edge.

A protrusion having the shape of an elongated ridge with at least one sharp cutting edge effectively cuts into the material. However, it is also possible to use other form of protrusions such as pins, fibers or other kind of protruding members.

In one embodiment, said at least one inwardly extending protrusion is extending substantially parallel to the horizontal axis of the cylinder.

Using inwardly extending protrusions arranged substantially parallel to the horizontal axis of the cylinder, the protrusions can interact with the protruding members arranged on the mantel surface of the rotating cylinder, thus creating an effecting processing step.

In another embodiment said at least one protrusion is divided in at least two parts arranged at an angle in relation to each other creating a v-shape arranged with its tip facing the support surface. Said angle between the two ridge parts can be between 20° and 50°, preferably 30°.

The v-shaped ridges make the processing process even more effective and forces the insulation material to move in the rotating direction of the cylinder, thus, minimizing the risk of jamming.

In another embodiment said protruding members arranged on the cylinder mantel surface are elongated protrusions extending substantially parallel to the horizontal axis.

By arranging protruding members having the form of elongated protrusions (ridges), with or without sharp edges, both on the cylinder mantel surface and the arc shaped surface, the protrusions on the cylinder and in the arc-shaped surface can interact, thus creating an even more effective dissolving of the insulation material.

The cutting edges of the protrusions, both on the cylinder and on the arc-shaped surface, are placed on the side of the protrusion first cutting into the material. Preferably the cutting edges are made sharp. In order to keep up an effective dissolving of insulation material, the protrusions can be replaced or sharpened after some wear.

The invention also relates to a loose-fill insulation apparatus comprising a device for dissolving compressed blocks of loose-fill cellulose thermal insulation material according to the above described embodiments and an arrangement adapted to directly feed the fluffed insulation material into the structure.

The invention also relates to a method for dissolving a block made by loose-fill cellulose thermal insulation material having a density of at least 160 kg/m$^3$ by using the steps:

- Positioning the insulation block on a support surface of a device for dissolving a compressed block of insulation according any of the above described embodiments comprising at least a rotating cylinder with protruding members and a processing zone arranged by an end of said support surface
- Feeding the insulation block into the processing zone
- Processing the insulation block between the protruding members arranged on the cylinder and the processing zone by rotation of the cylinder so that a fluffed loose-fill insulation material is formed, having a substantially even density of less than 35 kg/m$^3$ which is ready to be installed.

When using a device for dissolving a compressed block of insulation material in a method according to the above, it is possible to dissolve insulation blocks compressed into a higher density than before used. And with a more compressed material, more insulation material can be transported to the building site using the same semi trailer volume. Thus, the entire insulation process may be faster and more cost effective.

Please note that all the embodiments or features of an embodiment as well as any method or step of a method could be combined in any way if such combination is not clearly contradictory.

BRIEF DESCRIPTION OF DRAWINGS

The invention is now described, by way of example, with reference to the accompanying drawings, in which.

DESCRIPTION OF EMBODIMENTS

The invention will now be described in more detail in respect of embodiments and in reference to the accompanying drawings. All examples herein should be seen as part of the general description and therefore possible to combine in any way in general terms. Again, individual features of the various embodiments may be combined or exchanged unless such combination or exchange is clearly contradictory to the overall function of the device.

Figure 1A:
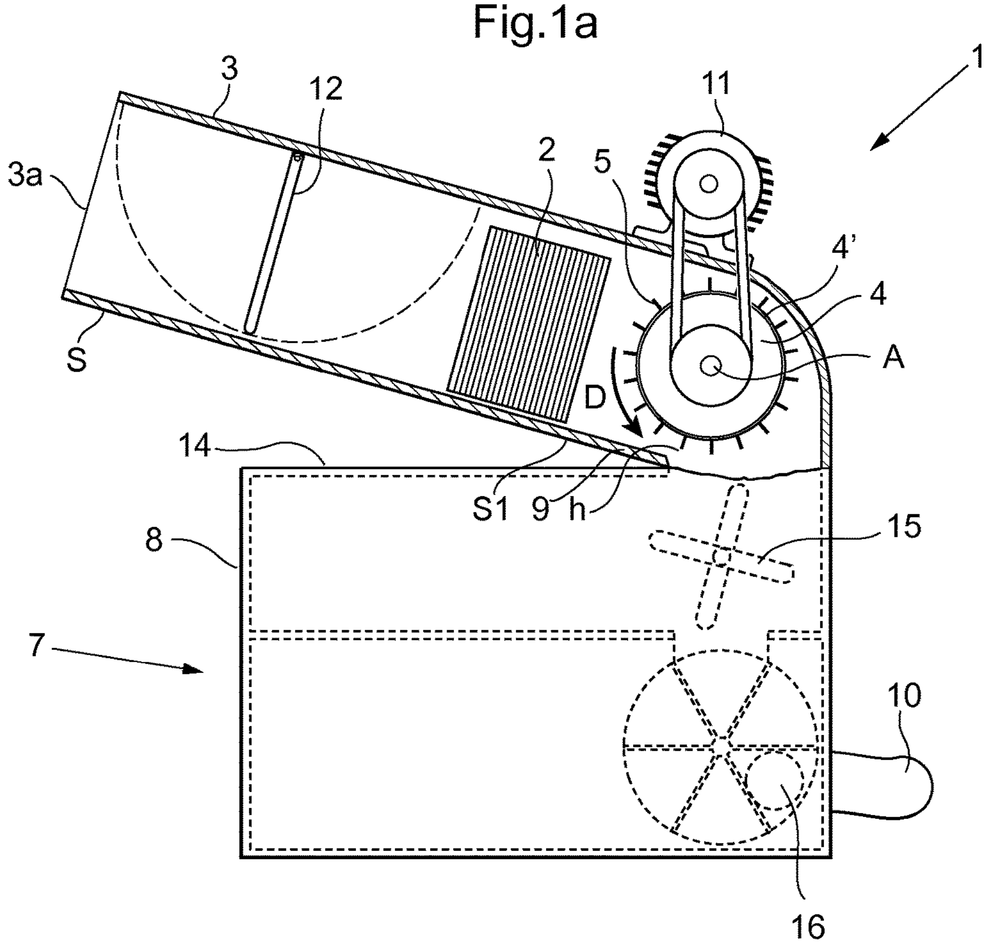
FIG. 1*a* discloses a first embodiment of the device for dissolving compressed blocks of insulation material mounted on a loose-fill insulation apparatus, FIGS. 1*b* and 1*c* disclose detail views of embodiments of the rotating cylinder arranged in the device, FIG. 2*a* discloses a detail view of the device including an arc-shaped processing zone, FIG. 2*b* discloses first embodiment of the arc-shaped processing zone, FIG. 2*c* discloses a second embodiment of the arc-shaped processing zone and FIG. 3 disclose a second embodiment of the device designed as being a part of a specially designed loose-fill insulation apparatus.

FIG. 1*a* discloses a device 1 for dissolving compressed blocks 2 of loose-fill of cellulose thermal insulation material according to the invention. The device 1 comprises a support surface S on which the insulation block 2 is arranged to be placed and a rotating cylinder 4 arranged by an edge S1 of the support surface S. A single cylinder 4 is used which is rotatable around a substantially horizontal axis A and has several protruding members 5 arranged on its mantel surface 4'. The cylinder 4 has a cylinder mantle surface 4' and a first and a second essentially parallel circular edge 4*a*, 4*b*.

When the cylinder 4 rotates around its substantially horizontal axis A, in direction D1 towards a processing zone 9 arranged by the edge S1 of the support surface S, the compressed blocks 2 of insulation is processed and dissolved between the protruding members 5 and the processing zone 9. The distance h between the top of the protruding members 5 on the cylinder mantel surface 4' and the processing zone 9 can be adjustable. Preferably the distance h is adjustable between 0 and 30 mm.

The protruding members 5 are preferably several elongated ridges with a certain length, height and width, extending essentially from the first 4*a* to the second edge 4*b*, in a direction substantially parallel to the horizontal length axis A of the cylinder. The protruding members 5 have at least one sharp cutting edge 5' arranged on the side of the protruding member facing the support surface S when the cylinder 4 rotates, i.e. on the forward rotation side of the protruding member 5. This to be able to better cut into the compressed insulation material to be dissolved.

Figure 1B:
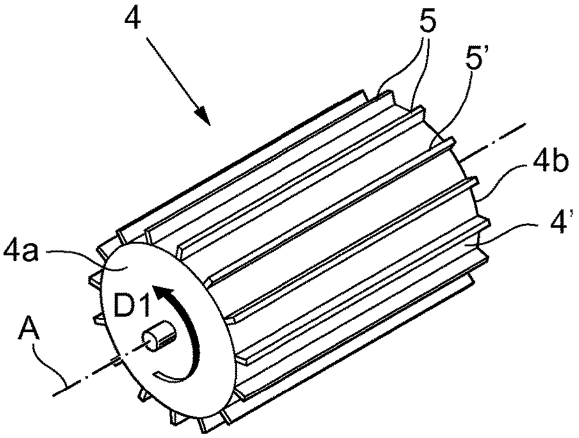
Figure 1C:
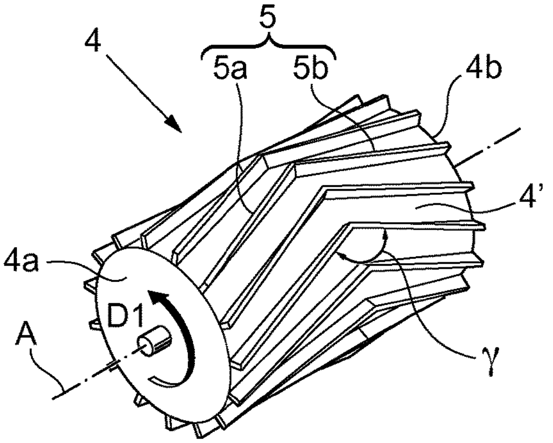

The protruding members 5 may be a straight ridge extending substantially across the entire length of the cylinder 4 from the first 4*a* to the second edge surface 4*b*, as described in FIG. 1*b*, but they may also be divided in at least two parts 5*a*, 5*b* arranged at an angle $\gamma$ in relation to each other creating a v-shape, see FIG. 1*c*. Said angle $\gamma$ may be between 20° and 50°, preferably 30°.

Preferably the diameter d of the rotating cylinder 4 is between 110 and 500 mm, preferably between 150 and 400 mm. The height of the protruding members 5 having the shape of several ridges are preferably between 3 and 10 mm, preferably 5-8 mm, and their width between 2 and 6 mm. The distance between the several ridges 5 is preferably between 5 and 20 mm, preferably 10 mm.

The protruding members 5 are adapted to process, dissolve and fluff the insulation into a required density of preferably less than 35 kg/m3. When the height of the protruding members 5 is short relative to the cylinder radius d the insulation material is processed rather than beaten into a less dense material. By using short protruding members 5, the compressed material in the blocks, preferably with a high density of at least 160 kg/m3, can receive the required density, preferably less than 35 kg/m3, in only one processing step.

The insulation apparatus 7 comprises the inventive device 1 for dissolving the compressed blocks 2 of insulation and a volume/hopper 8 in which the fluffed loose-fill insulation can be stored before it is injected into structures. Further, the apparatus 7 includes an outlet to which a flexible tube 10 is mounted and a power transmitting element 11, preferably an engine rotating a drive shaft, and a compressor (not disclosed). The loose-fill insulation material reaches the hopper 8 through the device 1 which has fluffed it into the required density. The required density is lower than the density of the block 2 of compressed insulation material fed through the device 1. Before the material is blown into the structure to be insulated, the material also passes a feeder 15 and a rotatable air lock 16, in the apparatus 7. The compressor creates airflow through the air lock 16, with a pressure enough to blow the loose-fill insulation into the structure.

The rotation D1 of the cylinder 4 is in FIG. 1 performed by the power transmitting element or engine 11 associated with the insulation apparatus.

Around at least a part of the support surface S it may be arranged a chute 3 with a chute inlet 3*a* in which the compressed insulation block 2 is inserted and a chute outlet where the dissolved insulation exits. The chute 3 has a substantially rectangular cross section and is adapted to receive the insulation block 2. The measures of the height and width of the rectangular cross section can be substantially different from each other, for example may the height of the chute be approximately 60% of the width. Other measures are of course possible. Further, the length of the chute 3 is preferably longer than a 600 mm, i.e. longer than the arm of a normal person. The chute inlet 3*a* can be covered by a closure part 12 adapted to prevent dust from exiting the opening.

In the embodiment according to FIG. 1 the device 1 is an additional separate unit to be placed on existing loose-fill apparatuses. The support surface S and the rotatable cylinder 4 are mounted on a frame 14, which is specially adapted to fit different types of insulation apparatuses. However, it is also possible to construct a complete loose-fill insulation apparatus 7 including the device 1 for dissolving compressed blocks of loose-fill insulation, see FIG. 3.

Figure 2A:
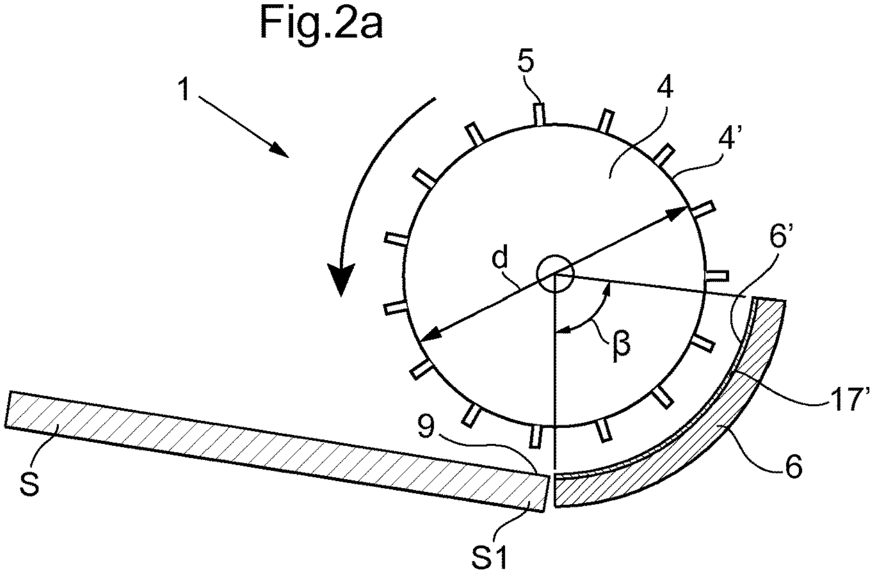
Figure 2B:
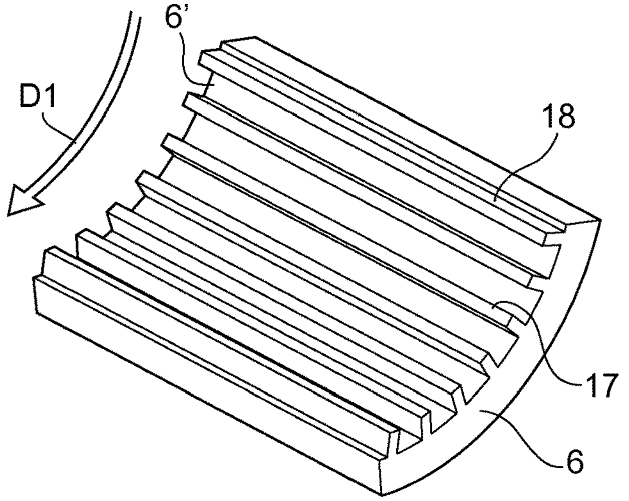
Figure 2C:
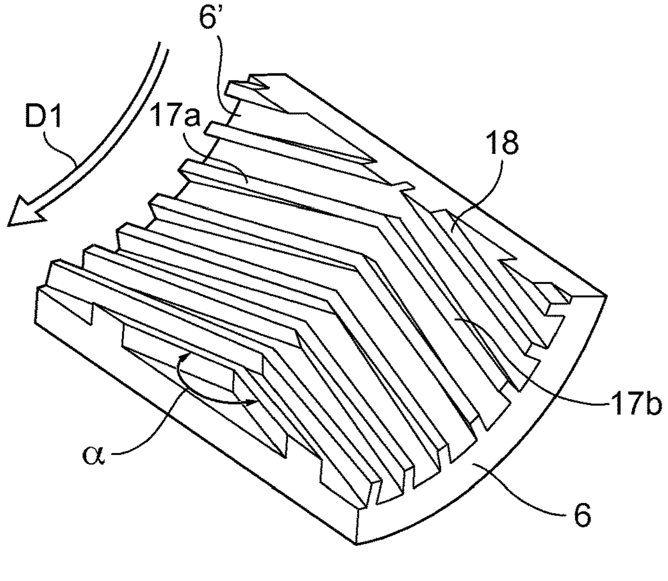

In order to prolong the processing zone 9, an object 6 having an arc-shaped surface 6' facing the cylinder 4 may be arranged by the prolongation of the support surface S, This is shown in FIGS. 2*a-c*. In this embodiment, the cylinder 4 is arranged to rotate inside of the arc-shaped surface 6. The arc-shaped surface 6' is partly covering the cylinder mantel surface 4' and prolongs the processing zone 9 in a peripheral direction of the cylinder 4.

In FIG. 2*a* an object 6 with the arc-shaped surface 6' prolonging the support surface S is more closely disclosed. The arc-shaped surface 6' of the object 6 covers between 10% and 30%, preferably between 15% and 25% of the cylinder mantel surface 4'. Preferably, at least a part of the second quadrant of the cylinder mantel surface 4' defined by the angle $\beta$, is the area being covered by the arc-shaped surface 6'. Thus, the angle $\beta$ can approximately be between 20° and 60°, preferably between 30° and 50°. A friction creating arrangement 17', having the shape of a high friction layer, is arranged facing the cylinder 4. The high friction layer may comprise a high friction material such as for example rubber or may comprise particles of sand or other particles creating a rough surface.

In FIG. 2*b* it is shown a detail view of an embodiment of the arc-shaped surface 6' with a friction creating arrangement 17' comprising at least one protrusion 17 protruding in a substantially radial direction inwards from the arc-shaped surface 6'. The protrusion 17 is having the shape of at least one elongated ridge with at least one sharp cutting edge 18 arranged on the side of the ridge facing the insulation material to be dissolved. In this embodiment the protrusions 17 extends substantially parallel to the horizontal axis A of the cylinder. However, it is also possible to use friction creating arrangements 17' having the shape of pins or other protrusions.

In FIGS. 2*c* and 2*d* another embodiment of the arc-shaped surface 6' is shown. Here the protrusions 17 are ridges divided into at least two ridge parts 17*a*, 17*b*. The parts 17*a*, 17*b* are arranged at an angle α in relation to each other and are attached to the surface 6' so that they substantially create a v-shape arranged with its tip facing towards the support surface S, thus in a direction opposite the rotation direction D1 of the cylinder 4. The ends of the parts 17*a*, 17*b*, creating the tip of the v-shape, can be connected (see FIG. 2*d*) or can be arranged at a certain distance from each other (see FIG. 2*c*). The angle α between the two ridge parts 17*a*, 17*b* is between 20° and 50°, preferably 30°.

Figure 3:
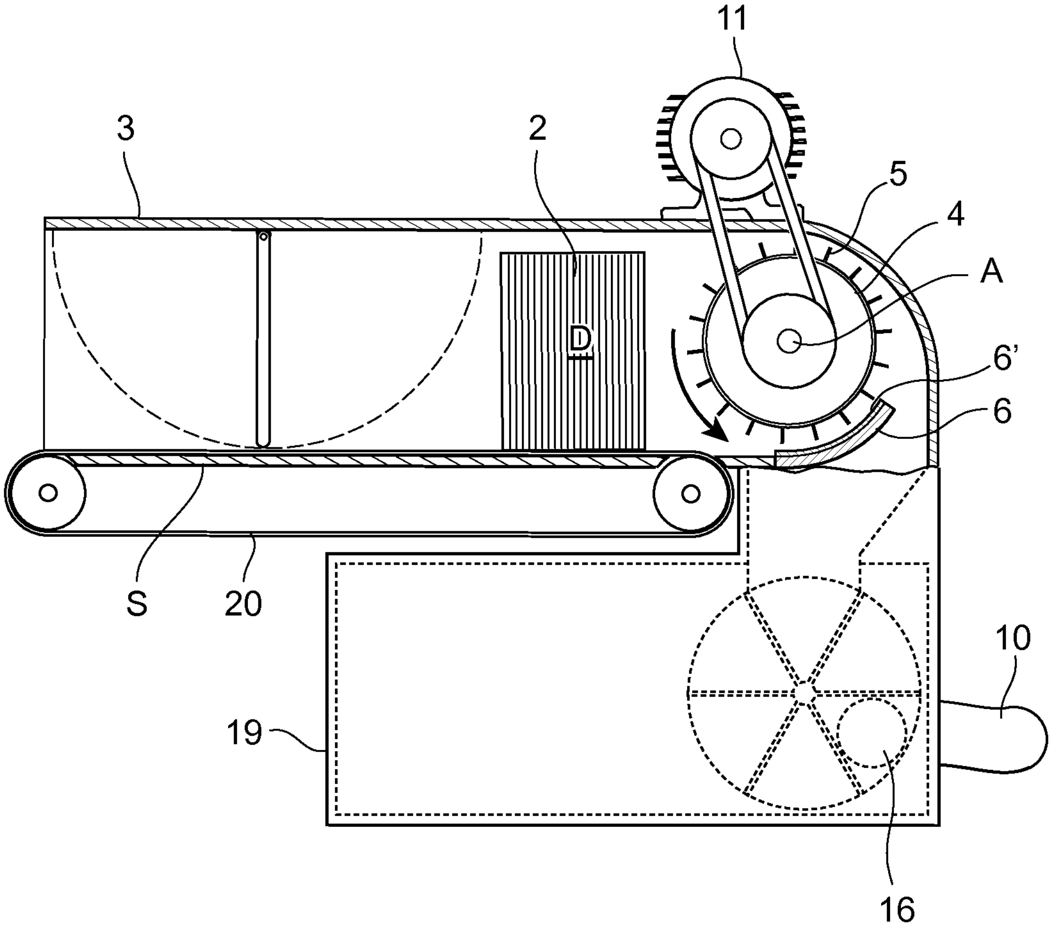

In FIG. 3 the device 1 is a unit to be placed on or integrated with an arrangement 19 which is adapted to directly feed the fluffed insulation material into the structure to be insulated, without using a temporary storage volume for the material. Thus, a much more compact specially designed loose-fill apparatus is created.

The arrangement 19 can for example comprise a rotatable air lock 16 comprising several separate rotating compartments. When the insulation material has passed the processing zone and the arc-shaped surface 6' due to the rotation of the cylinder 4, the fluff material falls into the separate compartments of the air lock 16. A compressor creates airflow through each compartment of the air lock 16, with a pressure enough to blow the loose-fill insulation into the structure at a constant or near constant rate via the flexible tube 10.

The support surface S is in this embodiment a transporting device 18, preferably an endless band or the like. By adjusting the speed of the transporting device 18 in relation to the rotational speed of the cylinder 4 and possibly also to the density of the blocks 2 and the rotational speed of the air lock 16, the fluffed material can be directly installed into the building. The speed of the transporting device 18 can be manually adjusted by the operator or automatically adjusted by a control system.

The rotational speed of the cylinder 4 is adjusted by the power transmitting element or engine 11. Preferably, the engine is rotating at a speed of between 1400 and 1800 revs/min. The engine 11 is connected to a central axis A of the cylinder 4, rotating it at the required speed and can for example be driven by electricity, hydraulics, pneumatics or mechanical arrangements.

When using the device 1 the insulation block 2 is positioned on the support surface S by an operator. The support surface S is used to feed the insulation block 2 into the processing zone 9. The support surface S can be mounted at an angle relative to the ground so that the insulation block 2 is transported towards the cylinder 4 by gravity force alone. However, the block 2 can also be automatically transported on a transporting device 18, for example an endless band, towards the cylinder 4. If the block is automatically transported into the cylinder 4, the support surface S can have any angle relative the ground. This facilitates for the operator of the device, since the insulation blocks do not have to be lifted so far from the ground level.

The loose-fill insulation apparatus 7 with the device 1 is adapted to blow the dissolved insulation material into the structure of the building to be isolated. Preferably the loose-fill insulation apparatus 7 is arranged in or nearby a semitrailer transporting the compressed blocks of insulation material to the building site. The blocks of insulation material is preferably compressed to a density of at least 160 kg/m3. Thus, the loading capacity of the semi-trailer can be fully or nearly fully used because of the more compact material.

When the compressed block 2 of insulation reaches the cylinder 4 chunks of the insulation is teared off from the block 2 and processed between the protruding members 5 and the arc-shaped surface 6' by rotation of the cylinder 5 in the direction D1. Thus, a fluffed loose-fill insulation material is formed, having a substantially even density of less than 35 kg/m3. Due to the rotation of the cylinder 4, the fluff material is transported over the arc-shaped surface 6' and falls down into a temporary storage in the hopper 8 or is directly blown into the structure to be isolated.

Thus, the method for picking apart a block may comprise the following steps:

- Using an operator or an automatic process to relocate an insulation block 2 from the interior of the semi trailer to the support surface S of the above described device 1 comprising a rotating cylinder 4 and a processing zone 9 arranged by an end S1 of said support surface S
- Feeding the insulation block 2 into the processing zone 9 by using gravity alone or a transport band of any kind, the transport band may be the support surface S
- Processing the insulation block 2 between the rotating cylinder 4 and the processing zone 9 by rotation of the cylinder 4 so that a fluffed loose-fill insulation material is formed, having a substantially even density of less than 35 kg/m3 which is ready to be installed.

The invention claimed is:

1. A device for picking apart compressed blocks of loose-fill cellulose thermal insulation material comprising:

a planar support surface for the compressed blocks of insulation having a processing zone by an end thereof, wherein the planar support surface is adapted for feeding the compressed blocks of insulation to the processing zone, a cylinder with a cylinder mantel surface and a first and a second edge, and protruding members arranged on the cylinder mantel surface, wherein said cylinder is rotatable around a horizontal axis in order to process and pick apart the compressed blocks of insulation between the protruding members and the processing zone, wherein said protruding members arranged on the cylinder mantel surface are elongated protrusions having a straight cutting edge extending parallel to the horizontal axis or a v-shaped cutting edge having two sections arranged at an angle (γ), each section with a straight cutting edge, wherein the two sections extend at opposite angles to the horizontal axis, so that the v-shaped cutting edge as a whole extends parallel to the horizontal axis.

2. The device according to claim 1, wherein said protruding members are elongated ridges.

3. The device according to claim 1, wherein said angle (γ) is between 20° and 50°.

4. The device according to claim 1, wherein said cylinder is arranged to rotate inside of an arc-shaped surface partly covering the cylinder mantel surface and prolonging the processing zone in a peripheral direction of the cylinder.

5. A loose-fill insulation apparatus comprising a device for picking apart compressed blocks of loose-fill cellulose thermal insulation material according to claim 1 and an arrangement adapted to directly feed dissolved thermal insulation material into a structure.

* * * * *